March 1, 1966
W. W. McMULLEN
3,237,961
MEANS IN A VEHICLE FOR MAINTAINING COORDINATION BETWEEN
THE VEHICLE'S TURNING AND LATERAL SLOPING
Filed Oct. 28, 1963
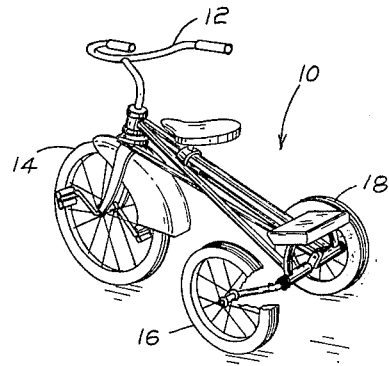
Fig. 1
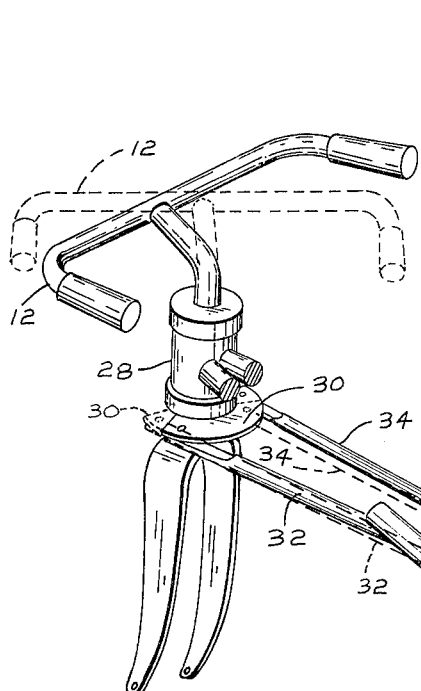
Fig. 2
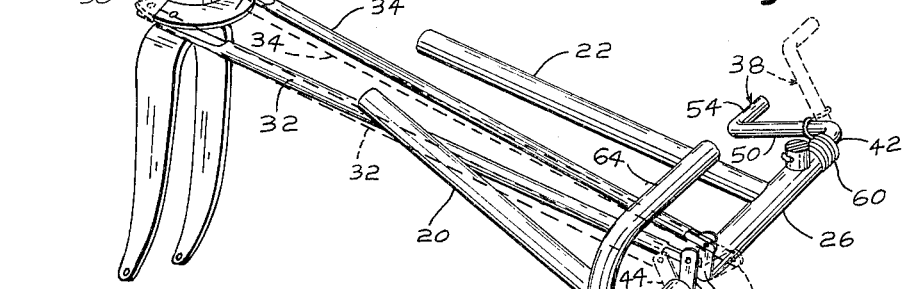
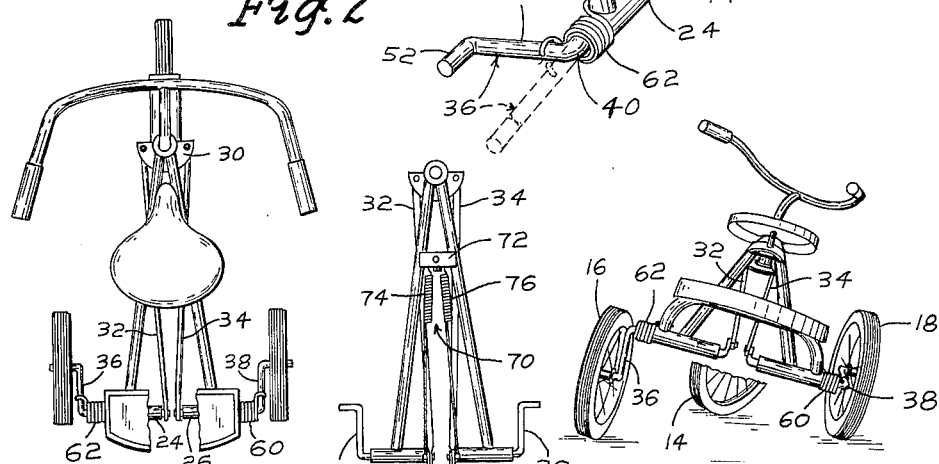
Fig. 3   Fig. 5   Fig. 4
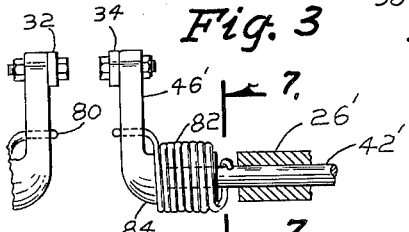   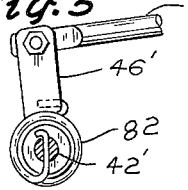
Fig. 6   Fig. 7
INVENTOR
WAYNE W. McMULLEN
BY
Dick & Zarley
ATTORNEYS

United States Patent Office 3,237,961
Patented Mar. 1, 1966

3,237,961
MEANS IN A VEHICLE FOR MAINTAINING CO-ORDINATION BETWEEN THE VEHICLE'S TURNING AND LATERAL SLOPING
Wayne W. McMullen, 1002 67th St., Des Moines, Iowa
Filed Oct. 28, 1963, Ser. No. 319,341
7 Claims. (Cl. 280—87)

This invention relates to a vehicle and in particular to a means for maintaining coordination between the vehicle's turning and lateral sloping.

Heretofore, a vehicle in making a turn would lean or slope laterally in the opposite direction of the turn due to the centrifugal forces shifting the center of gravity of the vehicle in the opposite direction of the turn. Highways and race tracks and the like are designed with elevated curves that lean into the turns to counteract this tendency for the vehicle to tip outwardly of the turn. Thus, it has not been uncommon for accidents to occur on curves or turns regardless of the type of vehicle involved.

Also heretofore, vehicles have been provided with steering means which operated independently of any lateral change in the center of gravity of the vehicle. And thus, it is one of the objects of this invention to utilize the changing center of gravity forces in guiding or steering a vehicle.

It is also an object of this invention to cause the steering means on a vehicle to turn in the direction to which the center of gravity of the vehicle has been shifted.

It is therefore an object of this invention to apply force to one side of a vehicle to cause it to turn laterally towards the applied force.

Another object of this invention is to automatically cause the vehicle to shift or slope into curves rather than away from them.

It is therefore an object of this invention to provide means for coordinating the lateral sloping of the vehicle with the vehicle's turning wherein the vehicle will slope laterally in the direction of the turn.

Accordingly, it is another object of this invention to provide a vehicle which slopes or tilts into curves and thereby makes a safer vehicle to operate since the vehicle does not have the normal tendency to tip over when making a turn.

It is also a further object of this invention to provide a vehicle having means for causing it to tip into turns and also provide a spring action ride.

A still further object of this invention is to provide a vehicle in which the operator may guide without the use of a conventional steering wheel means, but instead by shifting his weight to one side or the other thereby changing the center of gravity of the vehicle and causing it to turn in that direction.

It is still another object of this invention to provide a vehicle which after having been turned will automatically straighten itself out for straight-forward movement.

It is therefore another object of this invention to provide a vehicle which has a tendency to resist external forces causing it to turn in either lateral direction.

It is an object of this invention to provide a spring means for accelerating the return of the vehicle to a center position after making a turn; and also for the spring means to assist in cushioning the vehicle ride.

A further object of this invention is to provide a means in a vehicle for maintaining coordination between the vehicle's turning and lateral sloping which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a perspective view of velocipede (tricycle) utilizing the principles of this invention and having one of the rear wheels cut away to more clearly illustrate the tricycle's construction;

FIG. 2 is a fragmentary perspective view of the tricycle frame only showing its steering means, axles and interconnecting rod members in their positions when the tricycle is centered for straight forward movement and by dash lines in their positions when the tricycle has been turned to the right;

FIG. 3 is a top fragmentary plan view of the tricycle of FIG. 1;

FIG. 4 is a perspective rear end view of the tricycle of FIG. 1 showing in particular the relative position of the supporting wheels and frame during a right turn;

FIG. 5 is a top plan view of the tricycle frame and showing in particular an alternative spring centering mechanism;

FIG. 6 is a fragmentary rear elevation view of the rear axles and their connections to the push rods connected to the steering means and also showing an additional spring means as an alternative embodiment; and FIG. 7 is an elevation cross-sectional view taken along line 7—7 in FIG. 6 showing in particular the spring means connected to the rear axles.

Some of the principal features and advantages of this invention will be better understood from the following detailed description of its application to a tricycle referred to generally by the reference numeral 10 in FIG. 1.

The conventional structure of the tricycle 10 includes a steering support having a handle bar 12 for steering the vehicle through a single front wheel 14. At the rear of the tricycle 10, two smaller support wheels 16 and 18 are provided.

In FIG. 2 frame members 20 and 22 extend between bearing sleeves 24 and 26 which serve as supports for the rear axles, and the front end steering post 28. The steering post 28 is connected rigidly to the handle bars 12 and is provided with a semicircular plate 30 rigidly connected at its rear side and adapted to move therewith. At the lateral sides of the plate 30, a coordinating assembly is provided which includes a pair of push rods 32 and 34. The push rods are pivotally connected to the plate and extend therefrom to the rear end of the tricycle frame to a point above the axle bearing sleeves 24 and 26. Associated with the bearing sleeve members 24 and 26 are individual axle members 36 and 38 which have portions 40 and 42 pivotally mounted in the bearings 24 and 26 with their inner ends rigidly connected to upright elements 44 and 46 which are in turn pivotally connected to the push rods 32 and 34. The outer ends of the axle portions 40 and 42 are integral with perpendicular portions 48 and 50 which terminate in outwardly extending portions 52 and 54 parallel to the offset portions 40 and 42 respectively. The axle portions 52 and 54 have the wheels 16 and 18 rotatably mounted thereon respectively.

As illustrated in FIGS. 1 and 2, the push rods 32 and 34 are of a length to cause the axle portions 48 and 50 to form an approximately 20 degree angle with the horizontal when the tricycle is in its normal centered position with the front wheel 14 facing directly ahead and the frame of the bicycle being horizontally level. To assist in bringing the vehicle back to a level position after turning the front wheel 14, right and left torque type coil springs 60 and 62 are mounted on the axle bearing sleeves 26 and 24 with one pair of ends engaging the axle portions 48 and 50 and the other pair of spring ends bearing against the legs of a frame member 64 extending between the bearing sleeves 24 and 26 as best shown in FIG. 2 of the drawings. It is apparent also that the springs serve to cushion the ride as well as assist in levelling or centering the tricycle frame.

In operation it is seen in FIG. 4 that for example when the front wheel 14 is turned to the right, the right rear side of the tricycle 10 is lowered against the action of the spring 60 while the left rear side of the frame is raised thereby causing the tricycle to slope laterally into the turn. The dash lines in FIG. 2 represent the positions of the axles 36, 38; the push rods 32 and 34; and the steering structure including the handle bars 12, steering post 28 and plate 30. Upon turning the front wheel 14 to a straight forward position the push rods 32 and 34 will cause the axles 36 and 38 to pivot on the wheels 16 and 18 to level the tricycle frame. It is also apparent, that a downward force on the left rear portion of the frame as viewed in FIG. 4 would cause the frame to level out and the front wheel to move to a straight forward position.

While the safety features of this adaption of the invention to a tricycle are manifest, it is to also be appreciated that the child can guide the tricycle by merely shifting his weight from side to side since the center of gravity of the vehicle influences the direction the wheel 14 turns.

In FIG. 5 an alternative spring mechanism 70 is shown for bringing the vehicle back to a level position and centering the front wheel 14 after a turn to one side or the other. To the seat support structure 72, a pair of springs 74 and 76 are connected with their opposite ends connected respectively to the upright elements 44 and 46 on the axles 36 and 38. Accordingly, as the uprights 44 and 46 move alternately rearwardly as viewed in FIG. 5, the springs 74 and 76 will be placed under tension tending to return the frame to its normal position as shown in FIG. 1.

In addition to the preferred centering spring arrangement, including springs 60 and 62 or the alternate spring mechanism 70, additional springs 80 and 82 may be added to the tricycle 10 to improve its riding characteristics. As shown in FIGS. 6 and 7, the axle bearing sleeve 26' has an axle portion 42' pivotally mounted therein with its inner end connected to one end of a torsion coil spring 82. The other end of the spring 82 engages the upright 46' which has a bearing sleeve 84 for pivotally receiving the inner end of the axle portion 42'. Thus it is seen that the rearward forces applied by the push rods 32 and 34 are transmitted through the coil springs 80 and 82 to the axles 36 and 38 and consequently the rear end of the tricycle is free to resiliently move upwardly and downwardly and maintain a horizontal position thereby cushioning the vehicle ride.

From a consideration of the foregoing disclosure, it will be obvious that all of the initially recited objects of the present invention have been achieved.

Some changes may be made in the construction and arrangement of my means in a vehicle for maintaining coordination between the vehicle's turning and lateral sloping without departing from the real spirit and purpose of my invention, and it is my intention to cover by my claims, any modified forms of structure or use of mechanical equivalents which may be reasonably included within their scope.

I claim:

1. A vehicle having a frame,
   a steering support means connected to one end of said frame and having portions on opposite sides of said frame, and steering support means adapted to turn to either side of said frame from a plane parallel to the longitudinal axis of said frame,
   a support means at the other end of said frame on each side thereof,
   each of said side support means having an axle means, said axle means comprising first and second portions extending in parallel relationship and transversely of said frame, and are integrally connected by a perpendicular center portion, and said second portion being pivotally connected to the adjacent side support means,
   ground engaging means being mounted on said first portion,
   a first means operatively connected between said second portion of said axle means on said one side of said frame and to said portion on said steering means on the same side of said frame,
   a second means operatively connected between said second portion of said axle means on the other side of said frame and to said portion on said steering support means on the other side of said frame,
   said one side of said other end of said frame adapted to be raised by the turning of said steering support means to the other side of said frame as said other side of said other end of said frame is being lowered,
   said steering support means is disposed in said plane parallel to the longitudinal axis of said frame, said second portions are offset upwardly from said first portions, said second portions being arranged to pivot in said adjacent support means about the longitudinal axis of the integral first portions.

2. A vehicle having a frame,
   a steering support means connected to one end of said frame and having portions on opposite sides of said frame, said steering support means adapted to turn to either side of said frame,
   a support means at the other end of said frame on each side thereof,
   each of said side support means having an axle means, said axle means comprising a first portion and a second portion integral therewith offset upwardly and inwardly from said first portion and pivotally connected to said frame,
   a first means operatively connected between said second portion of said axle means on said one end of said frame and to said portion on said steering means on the same side of said frame,
   a second means operatively connected between said second portion of said axle means on the other side of said frame and to said portion on said steering means on the other side of said frame,
   said second portion of each of said axle means adapted to pivot about the longitudinal axis of the integral first portion, the direction of said pivotal movement being the same as the direction of movement of the first and second means respectively operatively connecting the second portions to the steering support means, and said first and second means adapted to move in opposite directions at times, and
   spring means normally urging each of said second portions of said axle means upwardly relative to the adjacent first portion.

3. A vehicle having a frame,
   a steering support means connected to one end of said frame and having portions on opposite sides of said frame, said steering support means adapted to turn to either side of said frame,
   a support means at the other end of said frame on each side thereof,
   each of said side support means having an axle means, said axle means comprising a first portion and a second portion integral therewith offset upwardly and inwardly from said first portion and pivotally connected to said frame,
   a first means operatively connected between said second portion of said axle on said one end of said frame and to said portion on said steering means on the same side of said frame, a second means operatively connected between said second portion of said axle means on the other side of said frame and to said portion on said steering means on the other side of said frame, said second portion of each of said axle means adapted to pivot about the longitudinal axis of the integral first portion, the direction of said pivotal movement being the same as the direction of movement of the first and second means respectively operatively connecting the second portions to the steering support means, and said first and second means adapted to move in opposite directions at times, and spring means normally urging each of said second portions of said axle means upwardly relative to the adjacent first portion, each of said first and second means including a spring means yieldingly urging said other end of said frame upwardly and adapted to directly transmit forces between said steering means and said axle means.

4. A vehicle having a frame, a first wheel mounted at one end of said frame to support said vehicle and having portions on opposite sides of said frame, said wheel adapted to pivot about a vertical axis, second and third wheels, an axle member for each of said second and third wheels, said axle member having a first portion and a second portion, said first and second portions being parallel to each other and integrally connected by a center portion extending perpendicular to said first and second portions, said second and third wheels rotatably mounted on the first potrion of their respective axle members, the second portions of said axle members being pivotally secured to opposite sides of the other end of said frame, and the second portion of each axle member normally elevated above and inwardly of the first portion, a first means connected to said portion on said first wheel on one side of said frame and operatively connected to the second portion of the axle member positioned on that side of the first wheel, a second means connected to said portion on said first wheel on the other side of the frame and operatively connected to the second portion of the axle member on the other side of the first wheel, said first means adapted to move towards the other end of said frame as said first wheel is turned towards said one side of the frame, said frame adapted to slope laterally downwardly on said one side of the frame, the second means adapted to move towards the first wheel end of the frame thereby lifting the other side of the frame upwardly, and said first means adapted to move towards the one end of the frame as said first wheel is turned towards the other side of the frame, said frame adapted to slope laterally downwardly towards the other side of the frame, the second means adapted to move towards the other end of the frame thereby lowering the other side of the frame.

5. A vehicle having a frame, a first frame supporting wheel at one end in the center of said frame, a vertical shaft rotatably connected to said frame, said first wheel being mounted on said shaft, connecting means on opposite lateral sides of said shaft when said first wheel is in its normal position in a plane parallel to the longitudinal axis of said frame, said connecting means adapted to move with said shaft as it is turned, an elongated rod extending from each of said connecting means towards the other end of said frame, an axle member extending transversely of said frame at each side of said other end, each of said axle members having first and second parallel portions integral with a center interconnecting portion, said first portions each extending outwardly of said frame and said second portions pivotally mounted on said frame, a frame supporting wheel mounted on each of said first portions, means at each side of said frame extending upwardly from the second portion of said axle and connected to the elongated rod on the same side of the frame, and said elongated rods being of such a length to hold said axle second portions above and rearwardly of said integral first portions when said first wheel is in its normal position.

6. The structure of claim 5 wherein a spring is operatively secured to each of said axles to cause the second portions of said axles to move upwardly and forwardly towards said first wheel end of said frame thereby tending to maintain the frame in a predetermined horizontal plane and the first wheel in its normal position.

7. The structure of claim 5 wherein each of said second portions of said axles is connected to the upwardly extending means by a spring means, and said spring means is biased to pivot said second portions towards said one end of said frame thereby yieldingly holding said frame in an up position with respect to a supporting surface.

References Cited by the Examiner

UNITED STATES PATENTS

| 530,552 | 12/1894 | Ridge. | |
| 776,078 | 11/1904 | Murphy. | |
| 1,859,415 | 5/1932 | Strandlund | 280—87 |
| 2,038,843 | 4/1936 | Jones | 280—92 |
| 2,134,515 | 10/1938 | Hoskyns. | |
| 2,260,102 | 10/1941 | Freret | 280—87 |
| 2,455,787 | 12/1948 | Linn | 267—58 |
| 2,696,387 | 12/1954 | Nordin | 280—87 XR |

FOREIGN PATENTS 376,252   5/1923   Germany.

A. HARRY LEVY, *Primary Examiner.*

KENNETH H. BETTS, MILTON BUCHLER,
*Examiners.*